March 24, 1931.    P. L. TENNEY    1,797,737
STEERING GEAR
Filed Feb. 21, 1927    2 Sheets-Sheet 1
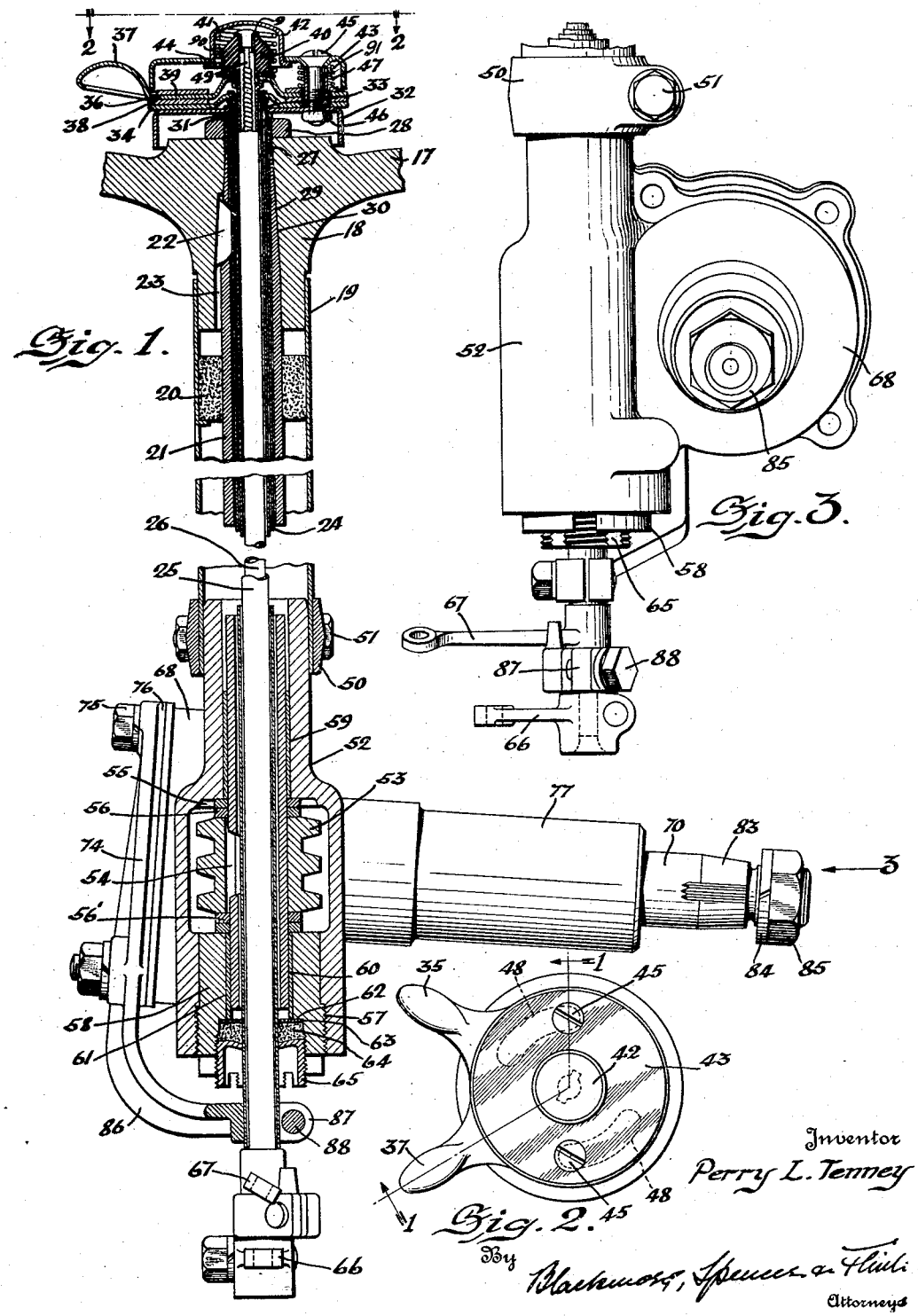

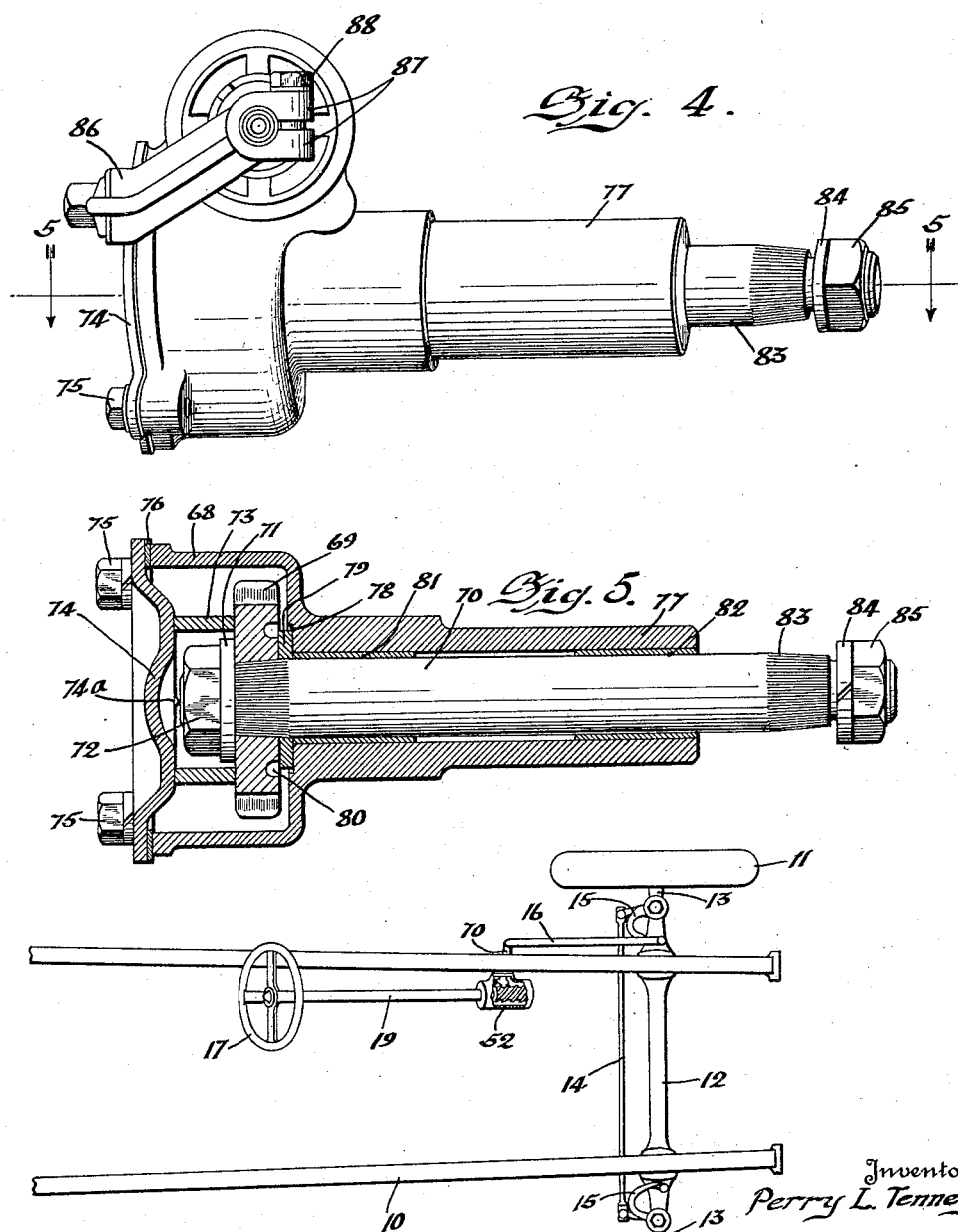

Patented Mar. 24, 1931

1,797,737

UNITED STATES PATENT OFFICE

PERRY L. TENNEY, OF MUNCIE, INDIANA, ASSIGNOR TO GENERAL MOTORS CORPORATION, OF DETROIT, MICHIGAN, A CORPORATION OF DELAWARE

STEERING GEAR

Application filed February 21, 1927. Serial No. 169,901.

This invention relates to steering gears particularly as applied to automotive vehicles.

In the past it has been customary to provide a bearing or bushing between the various concentric shafts, for example, the throttle and spark tubes, as it was supposed that such bearings or bushings were necessary to prevent rattle, however, in my invention I assemble, for example, the throttle and spark tubes in telescopic relation but without the use of bearings, bushings or other means to separate them. The supposed rattling of the tubes in prior construction was thought to occur because of the fact that the tubes were straight throughout their length, however, I have found that due to inaccuracies in manufacture and distortion during assembly the spark and throttle tubes when telescopically assembled will bind enough to prevent any appreciable noise due to rattling and will also permit of the one being easily rotated relative to the other.

My throttle and spark tubes are assembled within the stationary control tube which in turn is surrounded by the steering worm shaft and the latter inclosed within the steering mast jacket from which it is supported by suitable bearings.

I also have a novel assembly of levers or controls at the top of the steering column. The parts are of sheet metal and the spark and throttle levers are integral extensions of discs which are centrally secured to their respective tubes, preferably by upsetting the tube ends and flanging onto the disc and securing the flange and disc by a key. These discs have a friction plate interposed between them and upon the upper disc a second friction plate is arranged. The two friction plates are held stationary by means of two bolts which pass through the top and bottom plates of the assembly and are surrounded by springs which press downwardly on the plates to provide the necessary friction to secure the desired operating effect and to maintain the levers in their proper positions uninfluenced by the reactions transmitted from the tubes. This friction is of a degree that will give a proper softness that lends itself very readily to hand operation, and also serves to hold the parts together. This friction however, is not of such a character as to interfere with the easy operation of the throttle and spark levers.

In my novel steering gear arrangement I make use of helical gears at both steering shaft and cross shaft for by this arrangement it is possible to place the cross shaft at the given angle with reference to the steering shaft so that the former may be placed at right angles to the diverging side bar of the chassis frame. This arrangement permits of a maximum turning radius without interfering with the turning movement of the wheels, due to the fact that the drag link recedes toward the center line of the chassis when the wheel is turned in a direction which will make its rear portion tend to strike the drag link.

The invention is disclosed in the accompanying drawing in which:

Figure 1 is a section through the steering jacket or column of my invention taken on the line 1—1 of Figure 2, and looking in the direction of the arrows.

Figure 2 is a plan view of the controls taken on the line 2—2 of Figure 1.

Figure 3 is a view of the lower portion of the structure of Figure 1 looking in the direction of the arrow shown at the right of the figure.

Figure 4 is a bottom view of the cross-shaft housing and related structure.

Figure 5 is a section on the line 5—5 of Figure 4.

Figure 6 is a plan view of so much of an automotive vehicle as is necessary to illustrate the application of my invention thereto.

Referring to Figure 6, 10 designates the chassis frame, 11 the front wheels, 12 the axle, 13 the steering knuckles, 14 the tie rod, 15 the steering arm and 16 the drag link, which parts are conventional with motor vehicles.

In Figure 1, 17 designates the steering wheel having a hub 18, which is turnably mounted in the steering housing or jacket 19, having at its upper end a bushing 20 which surrounds the steering worm shaft 21 secured to the hub 18 by means of a key 22 fitting a slot 23. Telescoped within the steering worm shaft is the stationary control tube 24 and within this tube are to be found the throttle tube 25 and the spark tube 26. The upper end of the steering worm shaft is screw threaded at 27 and has screwed thereon a nut 28, the purpose of which is to draw the tapered portion 29 of the steering worm shaft 21 against the tapered seat 30 of the steering wheel hub.

The upper end of the stationary control tube 24 is upset as at 31 and has secured thereto a lower cup shaped stamping 32 which is held in place by means of an annular flange 33 preferably keyed to the stamping at the top of the tube, giving a purely mechanical connection without the aid of brazing.

The throttle tube 25 projects upwardly past the stationary control tube and is similarly upset and flanged to rigidly hold the throttle disc 34 which is secured to the tube by a keyed flange. This disc is seated upon stamping 32 and has formed thereon an integral handle 35 for operating the tube.

The spark tube 26 projects upwardly past the throttle tube and is upset and flanged similarly to the stationary and throttle tubes and has secured at the upset portion a second disc 36, having an integral handle 37 formed thereon. Between the discs 34 and 36 there is interposed a friction plate 38 and overlying the disc 36 is a second friction plate 39.

At the upper end of the spark tube 26, overlying its flanged end and resting on the disc 36, there is mounted a horn wire cap 40 of any suitable insulating material, carried in a support cap 90 having an integral bottom and four upwardly projecting prongs and surrounded by a spring 41 resting on the disc 36 and outwardly pressing on a horn button 42 passing through an opening in an upper cup shaped stamping 43 which overlies the disc 36. The cap 42 is held within the stamping 43 by means of an annular flange 44.

The upper and lower cups as well as the friction plates and control discs have bolt openings for the reception of two bolts 45 screwed into washers 46 welded to the underside of the lower stamping 32 and tapped to receive the threaded end of the bolts 45. Surrounding each bolt 45 and abutting at their ends against the supporting stampings 32, and 43 are the spacing collars 91. Surrounding both collars are coil springs 47, held between the upper stamping 43 and the upper friction plate 39, the purpose of these springs being to hold the friction plates and discs in frictional contact and prevent rattle. It will be noted that the discs 34 and 36 are provided with slots 48 in the path of the bolts 45 to permit the discs being turned.

Enclosed within the spark tube 26 and extending up past a flanged bushing 9 at the upper tapered end of the horn wire cap 40, is the horn wire 49, in the form of an armored cable.

At the lower end of the mast or jacket 19, there is attached by means of a clamp 50 and a bolt 51, a housing 52 enclosing a worm 53 secured by means of a key 54 to the lower end of the steering worm shaft 21. The housing has a recess 55 at its upper portion and between this recess and worm 53 are located two thrust washers 56.

The lower end of the housing is enlarged and internally screw threaded as at 57 and receives therein the steering worm adjusting block 58 the upper portion of which is plain and snugly fits within the housing, while the lower portion thereof is screw threaded to conform to the threaded portion 57 of the housing 52. Between the block 58 and the lower end of the worm 53 are positioned two thrust washers 56'.

The steering worm shaft 21 extends down through the upper portion of the housing 52 and into the bore 61 of the steering worm adjusting block 58, and upper and lower bushings 59 and 60 are interposed between the steering worm shaft and the housing and adjusting block, respectively.

The lower end of the bore of the block 58 is recessed as at 62 and internally screw threaded and in the bottom of this recess there rests a washer 63 and a packing 64 secured in the recess by means of a hollow packing nut 65 whose exposed end is castellated.

The lower ends of the spark and throttle tubes have secured thereto the usual operating levers 66 and 67, respectively.

The housing 52 has a lateral enlarged portion 68 in which is enclosed the helical gear 69 which meshes with the helical worm 53. The gear 69 is fastened to the tapered end of a cross-shaft 70 and is held thereon by means of a washer 71 and a nut 72. A thrust collar 73 bears against the face of the gear 69 and is held in place by means of the cover 74 secured to the housing by means of two bolts 75. Between the cover 74 and the enlarged portion 68 of the housing 52, a washer 76 is interposed to make an oil tight joint. The thrust collar 73 is provided with oil grooves 74a to permit circulation of the oil in the housing 52 to the inside of the collar 73. The housing 52 has an extension arm 77 which is recessed at 78 adjacent the gear 69, for the reception of a thrust washer 79 to take the thrust from the gear 69, and an oil groove 80 is provided on the face of the gear where it abuts the washer 79.

It is to be here noted that the cross-shaft 70 and its arm 77 forms an angle of greater than 90° with the steering worm shaft 21 and its housing 52, made possible by the use of helical gears between the shafts 21 and 70 and the purpose of which is to allow the shaft 70 to extend at right angles to and through the converging chassis side bar. This will permit of a maximum turning radius of the wheels without interference with the drag link, as the link will tend to move toward the center line of the chassis when the rear portion of the wheel swings in the direction of the drag link.

Within the extension arm 77 and surrounding the shaft 70 are inner and outer bushings 81 and 82, and on the exposed end 83 of the shaft 70 shown in Figures 4 and 5, there is attached the arm of the steering mechanism which forms the connection with the drag link. The end 83 is corrugated to secure a tight fit with the arm and has a spring washer 84 and a nut 85 to hold the arm in place.

The cover 74 it will be noted is provided with an integral clamping arm 86 which clamps the lower portion of the stationary control tube 24. This clamping is brought about by means of a split bearing 87 through the ends of which a bolt 88 is passed to rigidly hold the arm 86 onto the control tube.

The operation of my steering device is as follows: By turning the steering wheel 17 the steering worm shaft 21 attached thereto will be rotated which will cause the rotation of the worm 53 fixed to the lower end thereof. The worm 53 will communicate its motion to the worm wheel 69 rigid with the shaft 70 and from the shaft 70 the motion will be transmitted by the downwardly projecting arm to the drag link 16, and through the linkage 13, 14 and 15 to the front wheels 11.

To operate the throttle the handle 35 is turned which will rotate the disc 34, rigid with the upper end of the tube 25. The tube 25 is free to rotate and will swing the arm 67 attached to the opposite end and from which suitable connection is made to the throttle. The slots 48 in the disc 34 will permit the disc to rotate with reference to the bolts 45. The operation of the spark control is similar to the operation of the throttle control.

I claim:

1. In a motor vehicle control, a stationary control tube, a control assembly comprising a supporting stamping secured to the tube, a control disc directly supported on said stamping, a second control disc over the first disc, a friction disc interposed between said control discs, a friction disc over the second control disc, and a second stamping over the second mentioned friction disc, said discs comprising stampings, a plurality of bolts passing through said stampings and discs, and resilient means surrounding said bolts to hold said parts against rattle.

2. The combination of claim 1, said resilient means held between said second stamping and said second mentioned friction disc.

3. The combination of claim 1, and a spacing sleeve around each bolt, said resilient means surrounding said sleeves.

4. In a motor vehicle control, a control tube, a plurality of stampings supported from said tube constituting a control assembly and comprising a lower inverted cup shaped supporting member, a control operating member positioned directly on said supporting member, a stationary friction disc on said control member, a second movable control operating member on said friction disc, a second stationary friction disc on said second operating member, an upper inverted cup-shaped supporting member over but spaced from said second named friction disc, and a plurality of bolts passing entirely through said assembly to secure said assembly together.

5. In a motor vehicle control, a stationary control tube, a control assembly comprising a supporting stamping secured to the tube, a control disc directly supported on said stamping, a second control disc over the first disc, a friction disc interposed between said control discs, a friction disc over the second control disc, and a second stamping over the second mentioned friction disc, said discs comprising stampings, a plurality of bolts passing through said stampings and discs, resilient means surrounding said bolts to hold said parts against rattle, and a horn cap freely mounted on said second stamping.

6. In a motor vehicle control, a control assembly comprising stampings consisting of a plurality of plates and discs, bolts passing through said assembly to hold the parts together, and coil springs surrounding said bolts to hold the assembly in frictional contact, said springs positioned at the uppermost portion of said assembly between the two uppermost parts.

7. In a motor vehicle control, in combination, a control assembly including a control operating member and a stamping positioned thereover, a horn wire cap mounted over said member, a horn button secured on said stamping and cooperating with said cap, resilient means confined between said control operating member and said horn button to urge said button away from said assembly, and means to secure said assembly together.

8. In a motor vehicle control, in combination, a control assembly including a control operating member and a stamping positioned thereover, a horn wire cap mounted over said member, a horn button secured on said stamping and cooperating with said cap, a coil spring surrounding said cap, inclosed within said button and confined between said button and control operating member to urge said button away from said assembly, and means to secure said assembly together.

9. In a motor vehicle control, a control tube, a plurality of stampings supported from said tube constituting a control assembly and comprising a lower inverted cup-shaped supporting member, a control operating member positioned directly on said supporting member, a stationary friction disc on said control member, a second movable control operating member on said friction disc, a second stationary friction disc on said second operating member, an upper inverted cup-shaped supporting member over but spaced from said second named friction disc, a plurality of bolts passing entirely through said assembly to secure said assembly together, and spacing sleeves surrounding said bolts to maintain said supporting members in spaced relation.

10. In a motor vehicle control, a control tube, a plurality of stampings supported from said tube constituting a control assembly and comprising a lower inverted cup-shaped supporting member, a control operating member positioned directly on said supporting member, a stationary friction disc on said control member, a second movable control operating member on said friction disc, a second stationary friction disc on said second operating member, an upper inverted-cup-shaped supporting member over but spaced from said second named friction disc, a plurality of bolts passing entirely through said assembly to secure said assembly together, spacing sleeves surrounding said bolts to maintain said supporting members in spaced relation, and coil springs surrounding said sleeves and held between said upper supporting member and said second named friction disc to maintain the operating parts in frictional engagement within the control assembly and to prevent rattle.

In testimony whereof I affix my signature.

PERRY L. TENNEY.